(12) United States Patent
Chen et al.

(10) Patent No.: US 12,205,328 B2
(45) Date of Patent: Jan. 21, 2025

(54) SYSTEM FOR TRACKING CAMERA AND CONTROL METHOD THEREOF

(71) Applicant: HTC Corporation, Taoyuan (TW)

(72) Inventors: Hsing-Hung Chen, Taoyuan (TW); Hsu-Feng Lee, Taoyuan (TW)

(73) Assignee: HTC Corporation, Taoyuan (TW)

( * ) Notice: Subject to any disclaimer, the term of this patent is extended or adjusted under 35 U.S.C. 154(b) by 435 days.

(21) Appl. No.: 17/808,109

(22) Filed: Jun. 22, 2022

(65) Prior Publication Data

US 2023/0031480 A1 Feb. 2, 2023

Related U.S. Application Data

(60) Provisional application No. 63/226,184, filed on Jul. 28, 2021.

(51) Int. Cl.
*G06T 7/80* (2017.01)
*G06T 7/70* (2017.01)

(52) U.S. Cl.
CPC ............... *G06T 7/80* (2017.01); *G06T 7/70* (2017.01); *G06T 2207/30208* (2013.01)

(58) Field of Classification Search
CPC ... G06T 7/80; G06T 7/70; G06T 2207/30208; G06T 7/292; G06T 2207/10016; G06T 2207/30244; G06T 19/006; G06T 2207/20132; G01S 1/7036

USPC ............... 348/222.1; 382/107, 188, 103, 291
See application file for complete search history.

(56) References Cited

U.S. PATENT DOCUMENTS

| | | | | |
|---|---|---|---|---|
| 5,889,550 | A * | 3/1999 | Reynolds | G01S 5/16 348/E5.022 |
| 6,856,935 | B1 * | 2/2005 | Fehlis | G01S 5/16 348/E5.022 |
| 10,271,036 | B2 * | 4/2019 | Phipps | H04N 5/2224 |
| 10,552,014 | B2 * | 2/2020 | Densham | G06T 7/292 |
| 2022/0272235 | A1 * | 8/2022 | Gordon | H04N 5/2628 |

* cited by examiner

*Primary Examiner* — Lin Ye
*Assistant Examiner* — Chan T Nguyen
(74) *Attorney, Agent, or Firm* — CKC & Partners Co., LLC (57) ABSTRACT

A control method for tracking a camera include following steps. At least one image involving a calibration chart is captured by a camera. A first trackable device attached to the camera is tracked by a tracking station to generate a first rotation-translation matrix. A second trackable device attached to the calibration chart is tracked by the tracking station to generate a second rotation-translation matrix. A third rotation-translation matrix is generated according to the calibration chart appeared in the at least one image. A fourth rotation-translation matrix is calculated between the camera coordinate system and the first trackable device according to the first rotation-translation matrix, the second rotation-translation matrix and the third rotation-translation matrix. The fourth rotation-translation matrix is utilized to track the camera.

20 Claims, 9 Drawing Sheets

SYSTEM FOR TRACKING CAMERA AND CONTROL METHOD THEREOF

RELATED APPLICATIONS

This application claims the priority benefit of U.S. Provisional Application Ser. No. 63/226,184, filed Jul. 28, 2021, which is herein incorporated by reference.

BACKGROUND

Field of Invention

The disclosure relates to a tracking system and a control method. More particularly, the disclosure relates to the tracking system able to tracking a camera precisely and effectively.

Description of Related Art

Virtual Reality (VR), Augmented Reality (AR), Substitutional Reality (SR), and/or Mixed Reality (MR) devices are developed to provide immersive experiences to users. When a user wearing a head-mounted display (HMD) device, the visions of the user will be covered by immersive contents shown on the head-mounted display device. The immersive contents show virtual backgrounds and some objects in an immersive scenario.

One way to create lifelike immersive contents is shooting a film involving a real actor, a real car or a real animal, and merging these real items into the immersive scenario with some virtual objects and virtual backgrounds. To complete aforesaid merging, it must track pose data (positional data, rotational data) of these real items precisely. Otherwise, these real items will be located at wrong positions or along wrong directions in the immersive scenario.

SUMMARY

The disclosure provides a tracking system, which includes a camera, a first trackable device, a second trackable device, a tracking station and a processing unit. The camera is configured to capture at least one image involving a calibration chart. The first trackable device is physically attached to the camera. The second trackable device is physically attached to the calibration chart. The tracking station is configured to track the first trackable device and the second trackable device, for generating a first rotation-translation matrix, between the first trackable device and the tracking station, and a second rotation-translation matrix, between the second trackable device and the tracking station. The processing unit is communicated with the tracking station and the camera. The processing unit is configured to generate a third rotation-translation matrix, between a camera coordinate system of the camera and the calibration chart according to the calibration chart appeared in the at least one image. The processing unit is configured to calculate a fourth rotation-translation matrix, between the camera coordinate system and the first trackable device, according to the first rotation-translation matrix, the second rotation-translation matrix and the third rotation-translation matrix. The processing unit is configured to track the camera according to the first trackable device and the fourth rotation-translation matrix.

The disclosure provides a control method, which include steps of: capturing at least one image involving a calibration chart by a camera, wherein a first trackable device is physically attached to the camera, a second trackable device is physically attached to the calibration chart; tracking the first trackable device and the second trackable device by a tracking station, to generate a first rotation-translation matrix, between the first trackable device and the tracking station, and a second rotation-translation matrix, between the second trackable device and the tracking station; generating a third rotation-translation matrix, between a camera coordinate system of the camera and the calibration chart according to the calibration chart appeared in the at least one image; and calculating a fourth rotation-translation matrix, between the camera coordinate system and the first trackable device, according to the first rotation-translation matrix, the second rotation-translation matrix and the third rotation-translation matrix, wherein the fourth rotation-translation matrix is utilized to track the camera.

The disclosure provides a non-transitory computer-readable storage medium, storing at least one instruction program executed by a processing unit to perform aforesaid control method.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
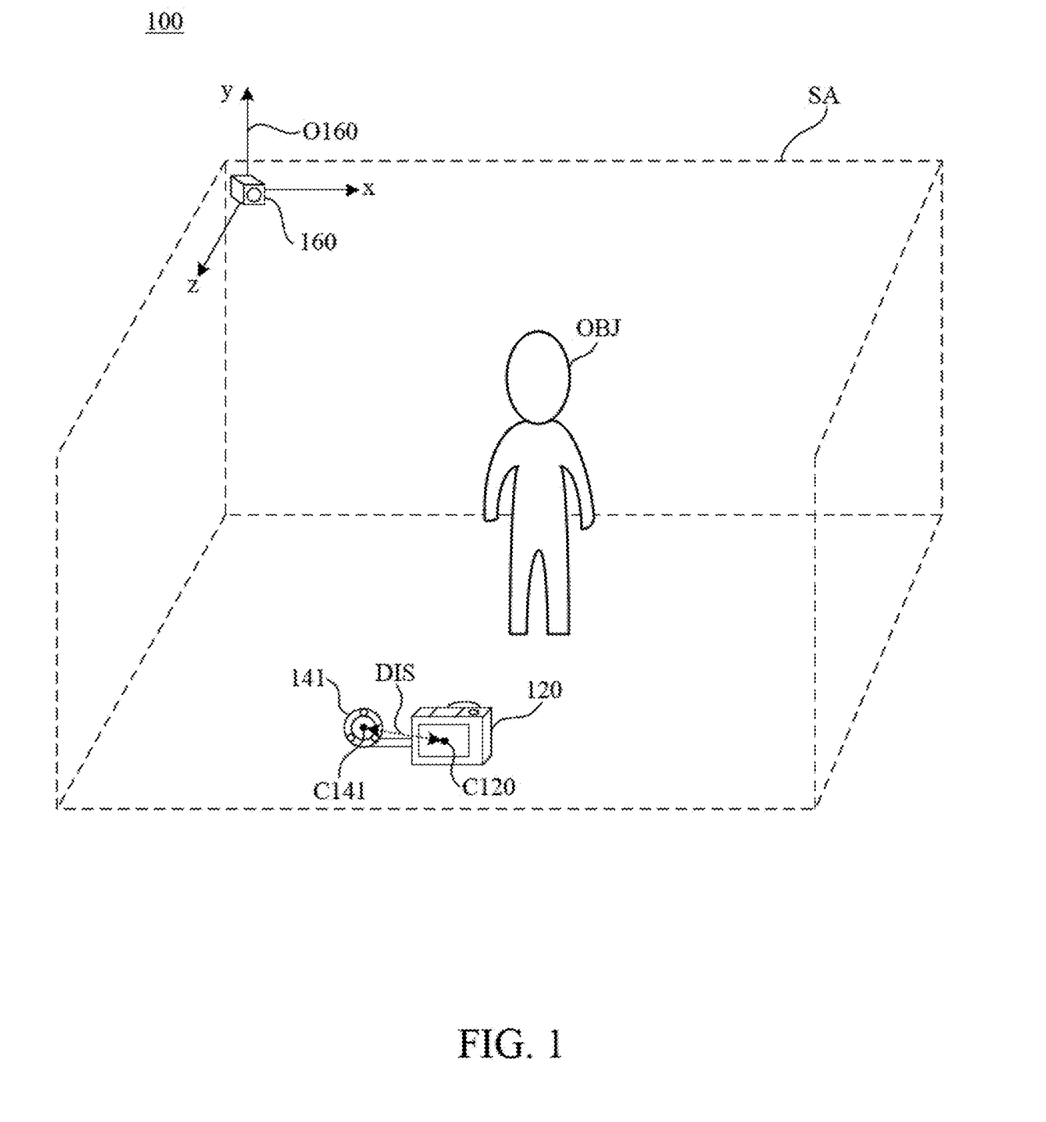
FIG. 1 is a schematic diagram illustrating a tracking system according to an embodiment of this disclosure.

Reference is made to FIG. 1, which is a schematic diagram illustrating a tracking system 100 according to an embodiment of this disclosure. As shown in FIG. 1, the tracking system 100 includes a camera 120, a first trackable device 141 and a tracking station 160 located in a spatial area SA. For example, the spatial area SA as shown in FIG. 1 can be a filming studio or a conference room in the real world, but the disclosure is not limited thereto. In some other embodiments, the spatial area SA can also be a specific area at an outdoor space (not shown in figures).

In some embodiments, the camera 120 is able to film a video or capture an image about a real object OBJ in the real world. For example, the real object OBJ is a fighting actor and the camera 120 is able to film a video about the fighting actor and merge the real object OBJ as a character in an immersive scenario. The immersive scenario may further include a virtual background (e.g., outer space) and some virtual objects (e.g., spaceships and aliens). To make sure the immersive scenario look real, it is important to track a position and an orientation of the camera 120, such that a view point of the video captured by the camera 120 can be determined precisely.

In some embodiments, the tracking system 100 includes a first trackable device 141 and a tracking station 160. As shown in FIG. 1, the first trackable device 141 is physically attached to the camera 120. The tracking station 160 is disposed at a fixed point in the spatial area SA. For example, the tracking station 160 is disposed at a corner near a ceiling of the room shown in FIG. 1. When the camera 120 moves, the first trackable device 141 correspondingly moves along with the camera 120. The tracking station 160 is capable of tracking the first trackable device 141, such that the tracking station 160 is able to acknowledge a rough position about the camera 120 (according to the tracked position of the first trackable device 141). In this case, the tracking station 160 is not able to track an exact position of the camera 120, because there is an offset distance still existed between the first trackable device 141 and the camera 120.

In some embodiments, the tracking station 160 may emit some optical tracking signals, and the first trackable device 141 may include optical sensors (not shown) for sensing the optical tracking signals from the tracking station 160, so as to track a spatial relationship between the first trackable device 141 and the tracking station 160. However, the disclosure is not limited to this optical sensing manner to track the first trackable device 141. In some other embodiments, the tracking station 160 can utilize a computer vision to track a feature pattern on the first trackable device 141.

Based on functions of the tracking station 160 and the first trackable device 141, the tracking system 100 can track a reference center C141 of the first trackable device 141. Because the first trackable device 141 is physically attached to the camera 120, in some cases, the reference center C141 is recognized as the position of the camera 120. However, as shown in FIG. 1, there is an offset distance DIS between the reference center C141 of the first trackable device 141 and an optical center C120 of the camera 120.

If the reference center C141 of the first trackable device 141 is assumed to be the view point of the camera 120, the video filmed by the camera 120 will be assumed to capture from a wrong view point (i.e., the reference center C141) slightly shifted from a real view point (i.e., the optical center C120). It is desired to acknowledge the offset distance DIS between the reference center C141 and the optical center C120 to calibrate aforesaid shifting. The optical center C120 of the camera 120 is located inside the camera 120 and affected by lens, pixel sensors and optical components of the camera 120. It is hard to determine a precise position of the optical center C120 of the camera 120. Therefore, the offset distance DIS can't be measured directly.

Figure 2:
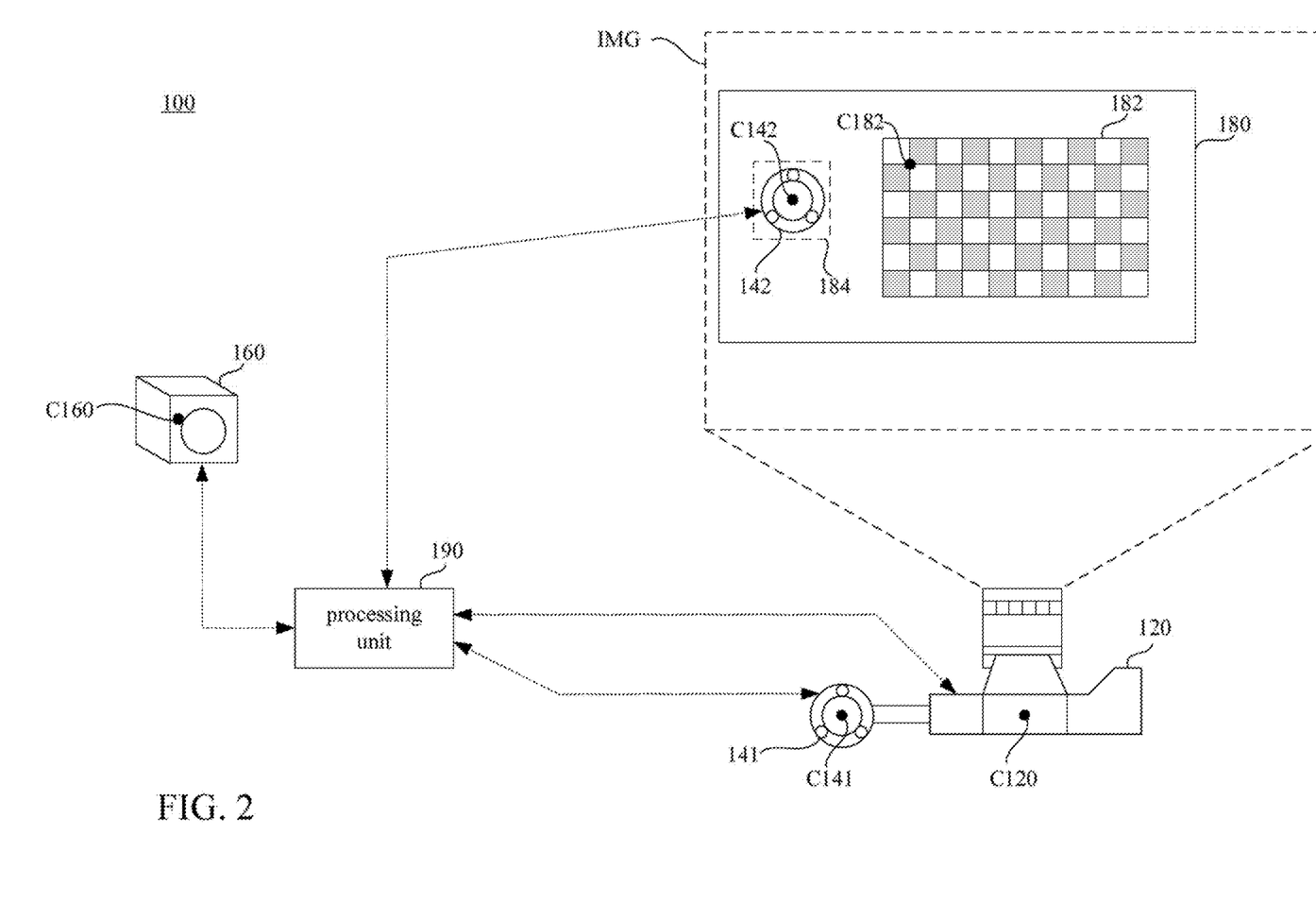
FIG. 2 is a schematic diagram illustrating the tracking system with a function to track the optical center of the camera during a calibration process according to an embodiment of this disclosure.

In some embodiments, the tracking system 100 provides a manner to measure the offset distance DIS, so as to track and calibrate the camera 120 precisely. Reference is further made to FIG. 2, which is a schematic diagram illustrating the tracking system 100 with a function to track the optical center C120 of the camera 120 during a calibration process according to an embodiment of this disclosure.

As shown in FIG. 2, the tracking system 100 further includes a calibration chart 180, a second trackable device 142 and a processing unit 190. The second trackable device 142 is physically attached to the calibration chart 180. The tracking station 160 is capable of tracking the second trackable device 142, so as to track a reference center C142 of the second trackable device 142.

In some embodiments, the processing unit 190 is communicated with the camera 120, the tracking station 160, the first trackable device 141 and the second trackable device 142. The processing unit 190 can be a central processing unit (CPU), a graphic processing unit (GPU), a processor and/or an application-specific integrated circuit (ASIC). In some embodiments, the processing unit 190 can be implemented in a stand-alone computer or a stand-alone server, but the disclosure is not limited thereto. In some other embodiments, the processing unit 190 can be integrated in the camera 120 or the tracking station 160.

In some embodiments, the tracking station 160 may emit some optical tracking signals, and the second trackable device 142 may include optical sensors (not shown) for sensing the optical tracking signals from the tracking station 160, so as to track a spatial relationship between the second trackable device 142 and the tracking station 160. However, the disclosure is not limited to this optical sensing manner to track the second trackable device 142. In some other embodiments, the tracking station 160 can utilize a computer vision to track the second trackable device 142.

The calibration chart 180 includes a feature pattern 182 and a mounting socket 184. As shown in FIG. 2, the feature pattern 182 in some embodiments can be a chessboard pattern, which includes white blocks and dark blocks with predetermined sizes and arranged in predetermined gaps. The chessboard pattern is helpful to perform a geometric camera calibration on the camera 120. For example, the geometric camera calibration can be executed based on a pinhole camera model for calibration.

The second trackable device 142 is attached on the mounting socket 184 and located with a mechanical arrangement relative to the feature pattern 182. As shown in FIG. 2, when the second trackable device 142 is mounted on the mounting socket 184, a reference center C142 of the second trackable device 142 will hold at a fixed position limited by the mounting socket 184. In this case, the reference center C142 of the second trackable device 142 will has a predetermined relationship relative to a reference center C182 of the feature pattern 182 on the calibration chart 180. The mechanical arrangement can be directly measured and manually designed. For example, by forming the mounting socket 184 at a desired position, the reference center C142 can be placed at 30 cm left and 10 cm under relative to the reference center C182 of the feature pattern 182 in the mechanical arrangement. Aforesaid spatial relationship between the second trackable device 142 and the feature pattern 182 can be described as a fifth rotation-translation matrix RT5.

In some embodiments, during the calibration process, the camera 120 is triggered to capture at least one image IMG involving the calibration chart 180. Based on the image IMG and tracking results of the first/second trackable devices 141 and 142, the processing unit 190 is able to calculate the offset distance between the reference center C141 of the first trackable device 141 and the optical center C120 of the camera 120.

Figure 3:
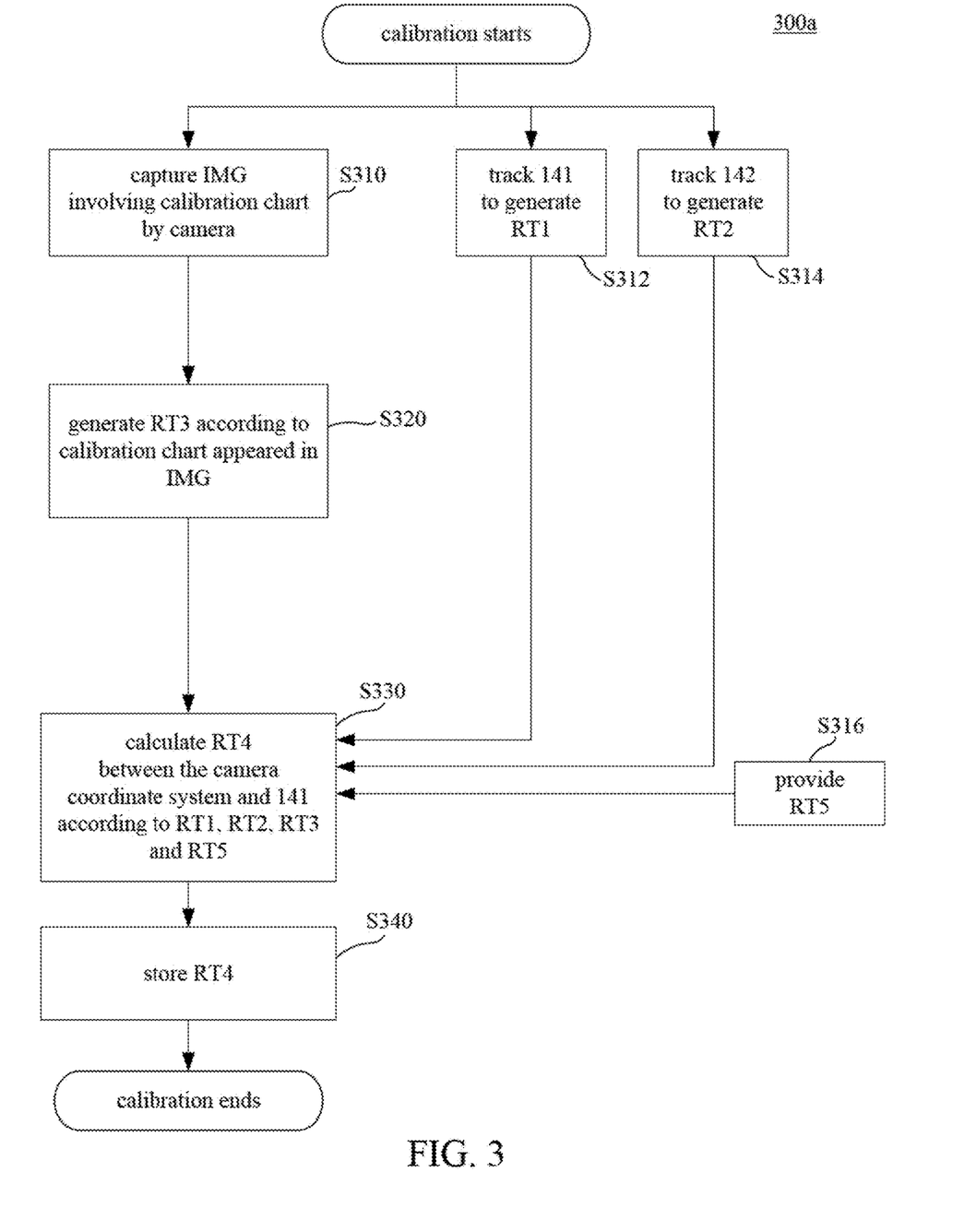
FIG. 3 is a flow chart illustrating a control method performed by the tracking system in FIG. 2 during the calibration process.
Figure 4:
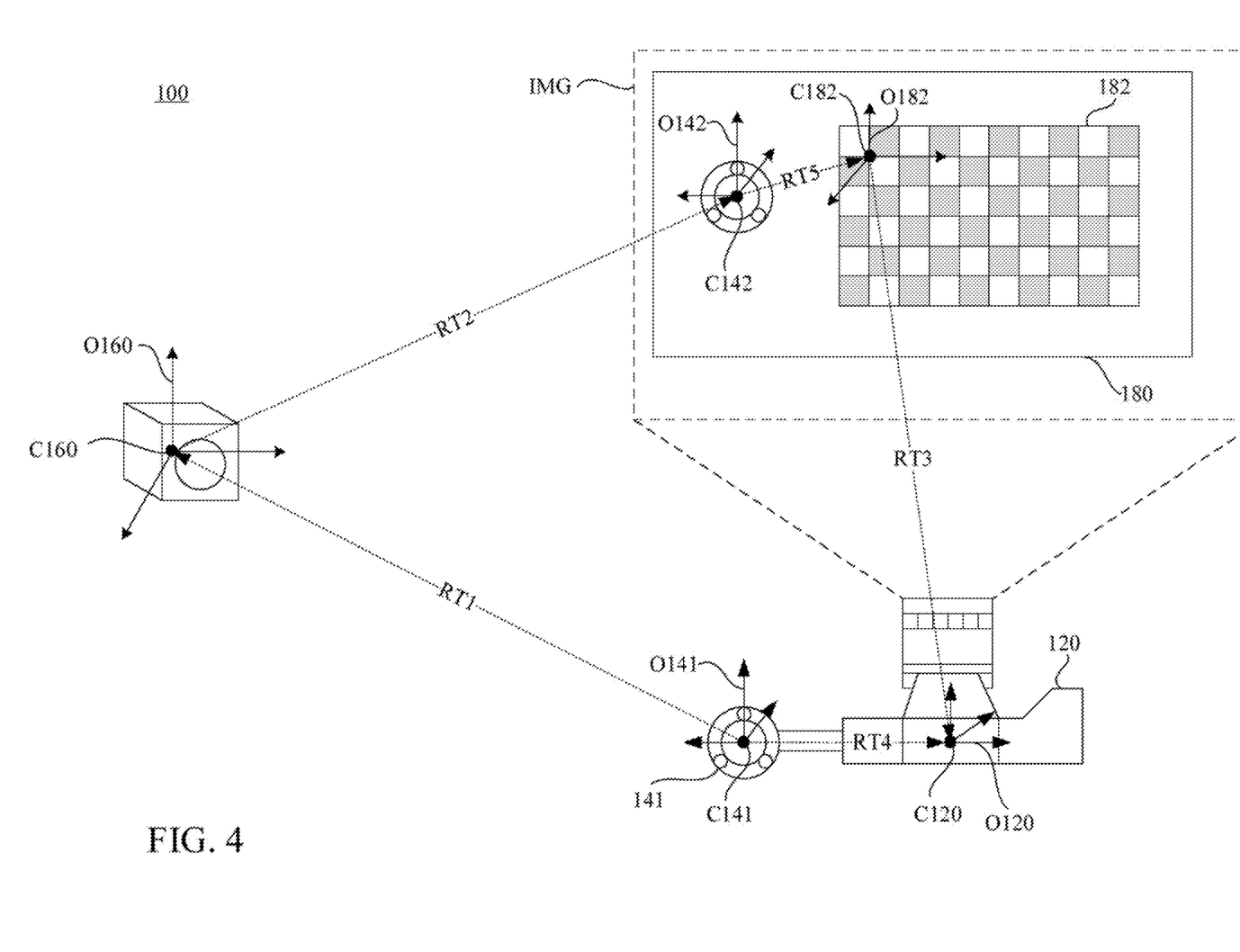
FIG. 4 is a schematic diagram illustrating the tracking system during the calibration process according to an embodiment of this disclosure.

Reference is further made to FIG. 3 and FIG. 4. FIG. 3 is a flow chart illustrating a control method 300a performed by the tracking system 100 in FIG. 2 during the calibration process. FIG. 4 is a schematic diagram illustrating the tracking system 100 during the calibration process according to an embodiment of this disclosure.

As shown in FIG. 2, FIG. 3 and FIG. 4, step S310 is executed to trigger the camera 120 to capture the image IMG (as shown in FIG. 2) involving the calibration chart 180.

Step S312 is executed to track pose data of the first trackable device 141 by the tracking station 160, further to generate a first rotation-translation matrix RT1, between the first trackable device 141 and the tracking station 160, according to the pose data of the first trackable device 141. The first rotation-translation matrix RT1 is configured to describe a rotational relationship and a positional relationship between a coordinate system O141 of the first trackable device 141 and a coordinate system O160 of the tracking station 160. In some embodiments, the first rotation-translation matrix RT1 defines as a rotation-translation matrix $RT_{first\ trackable\ device}^{tracking\ station}$ for transforming a vector originally in the coordinate system O141 into an equivalent vector in the coordinate system O160.

Step S314 is executed to track pose data of the second trackable device 142 by the tracking station 160, further to generate a second rotation-translation matrix RT2, between the second trackable device 142 and the tracking station 160, according to the pose data of the second trackable device 142. The second rotation-translation matrix RT2 is configured to describe a rotational relationship and a positional relationship between a coordinate system O142 of the second trackable device 142 and the coordinate system O160 of the tracking station 160. In some embodiments, the second rotation-translation matrix RT2 defines as a rotation-translation matrix $RT_{tracking\ station}^{second\ trackable\ device}$ for transforming a vector originally in the coordinate system O160 into an equivalent vector in the coordinate system O142.

Step S316 is executed to provide a fifth rotation-translation matrix RT5 between the calibration chart 180 and the second trackable device 142. In some embodiments, the fifth rotation-translation matrix RT5 is derived according to spatial relationship between the second trackable device 142 and the feature pattern 182. Since the second trackable device 142 is mounted on the mounting socket 184 disposed on the calibration chart 180, a location of the mounting socket 184 can be designed to achieve desirable values of the fifth rotation-translation matrix RT5. The fifth rotation-translation matrix RT5 can be directly measured and manually designed by adjusting the location of the mounting socket 184. In some embodiments, the fifth rotation-translation matrix RT5 defines as a rotation-translation matrix $RT_{second\ trackable\ device}^{calibration\ chart}$ for transforming a vector originally in the coordinate system O142 into an equivalent vector in the coordinate system O182.

Step S320 is executed to generate a third rotation-translation matrix RT3 between a camera coordinate system O120 of the camera 120 and a coordinate system O182 of the feature pattern 182 on the calibration chart 180 according to the calibration chart 180 appeared in the image IMG. In some embodiments as shown in FIG. 3.

In some embodiments, during the step S320, the processing unit 190 utilizes a computer vision algorithm to generate the third rotation-translation matrix RT3, between the camera coordinate system O120 of the camera 120 and the coordinate system O182 of the feature pattern 182 on the calibration chart 180, according to the calibration chart 180 appeared in the image IMG In some embodiments, the computer vision algorithm in step S320 is performed to detect a relative movement between the camera 120 and the calibration chart 180. For example, when the feature pattern 182 appears to be smaller in the image IMG, the third rotation-translation matrix RT3 generated by the processing unit 190 will indicate that the camera coordinate system O120 is moved to a position far from the coordinate system O182. In another example, when the feature pattern 182 appears to be bigger in the image IMG, the third rotation-translation matrix RT3 generated by the processing unit 190 will indicate that the camera coordinate system O120 is moved to a position close to the coordinate system O182. In another example, when one edge of the feature pattern 182 appears to be bigger than an opposite edge of the feature pattern 182 in the image IMG, the third rotation-translation matrix RT3 generated by the processing unit 190 will indicate a rotation angle between the camera coordinate system O120 is close to the coordinate system O182. In some embodiments, the third rotation-translation matrix RT3 defines as a rotation-translation matrix $RT_{calibration\ chart}^{camera}$ for transforming a vector originally in the coordinate system O182 into an equivalent vector in the camera coordinate system O120.

It is noticed that the camera coordinate system O120 is originated at the optical center C120 of the camera 120. It is hard to directly measure the position of the optical center C120 in a mechanical way, because the optical center C120 is a theoretical point inside the camera 120. In this case, a fourth rotation-translation matrix RT4 between the camera coordinate system O120 and the coordinate system O141 of the first trackable device 141 can't be measured directly according to the physical connection between the first trackable device 141 and the camera 120. As shown in FIG. 3 and FIG. 4, step S330 is executed by the processing unit 190 to calculate the rotation-translation matrix RT4, between the camera coordinate system O120 and the coordinate system O141 of the first trackable device 141, according to the rotation-translation matrices RT1, RT2, RT3 and RT5.

In some embodiments, the fourth rotation-translation matrix RT4 defines as a rotation-translation matrix $RT_{camera}^{first\ trackable\ device}$ for transforming a vector originally in the camera coordinate system O120 into an equivalent vector in the coordinate system O141 (of the first trackable device 141). The fourth rotation-translation matrix RT4 can be calculated as below:

$$RT4 = RT_{first\ trackable\ device}^{camera}$$
$$= RT_{calibration\ chart}^{camera} \times RT_{second\ trackable\ device}^{calibration\ chart} \times$$
$$RT_{tracking\ station}^{second\ trackable\ device} \times RT_{first\ trackable\ device}^{tracking\ station}$$
$$= RT3 \times RT5 \times RT2 \times RT1$$

As shown above, the fourth rotation-translation matrix RT4 is calculated by the processing unit 190 according to a product of the third rotation-translation matrix RT3, the fifth rotation-translation matrix RT5, the second rotation-translation matrix RT2 and the first rotation-translation matrix RT1.

In some embodiments, the tracking system 100 and the control method 300a is able to calculate the fourth rotation-translation matrix RT4 during the calibration process. The fourth rotation-translation matrix RT4 is configured to describe a rotational relationship and a positional relationship between the camera coordinate system O120 and the first trackable device 141. Because the first trackable device 141 is physically attached to the camera 120 at a fixed position, the fourth rotation-translation matrix RT4 known in S330 will remain stable. The camera coordinate system O120 is originated at the optical center C120 of the camera 120.

In this case, the tracking system 100 is able to track a precise position of the optical center C120 of the camera 120 and the camera coordinate system O120, by tracking the first trackable device 141 (and the coordinate system O141) and applying the fourth rotation-translation matrix RT4 onto the tracking result of the first trackable device 141 (and the coordinate system O141).

In step S340, as shown in FIG. 2, FIG. 3 and FIG. 4, the processing unit 190 can store the fourth rotation-translation matrix RT4. In some embodiments, the fourth rotation-translation matrix RT4 can be stored in digital data storage (not shown in figures), such as a memory, a hard drive, a cache, a flash memory or any similar data storage. After the calibration process, the stored fourth rotation-translation matrix RT4 is utilized to track the optical center C120 of the camera 120.

In aforesaid embodiments shown in FIG. 3, the control method 300a triggers the camera to capture one image IMG for calculating the fourth rotation-translation matrix RT4. However, the disclosure is not limited to capture one image IMG.

Figure 5:
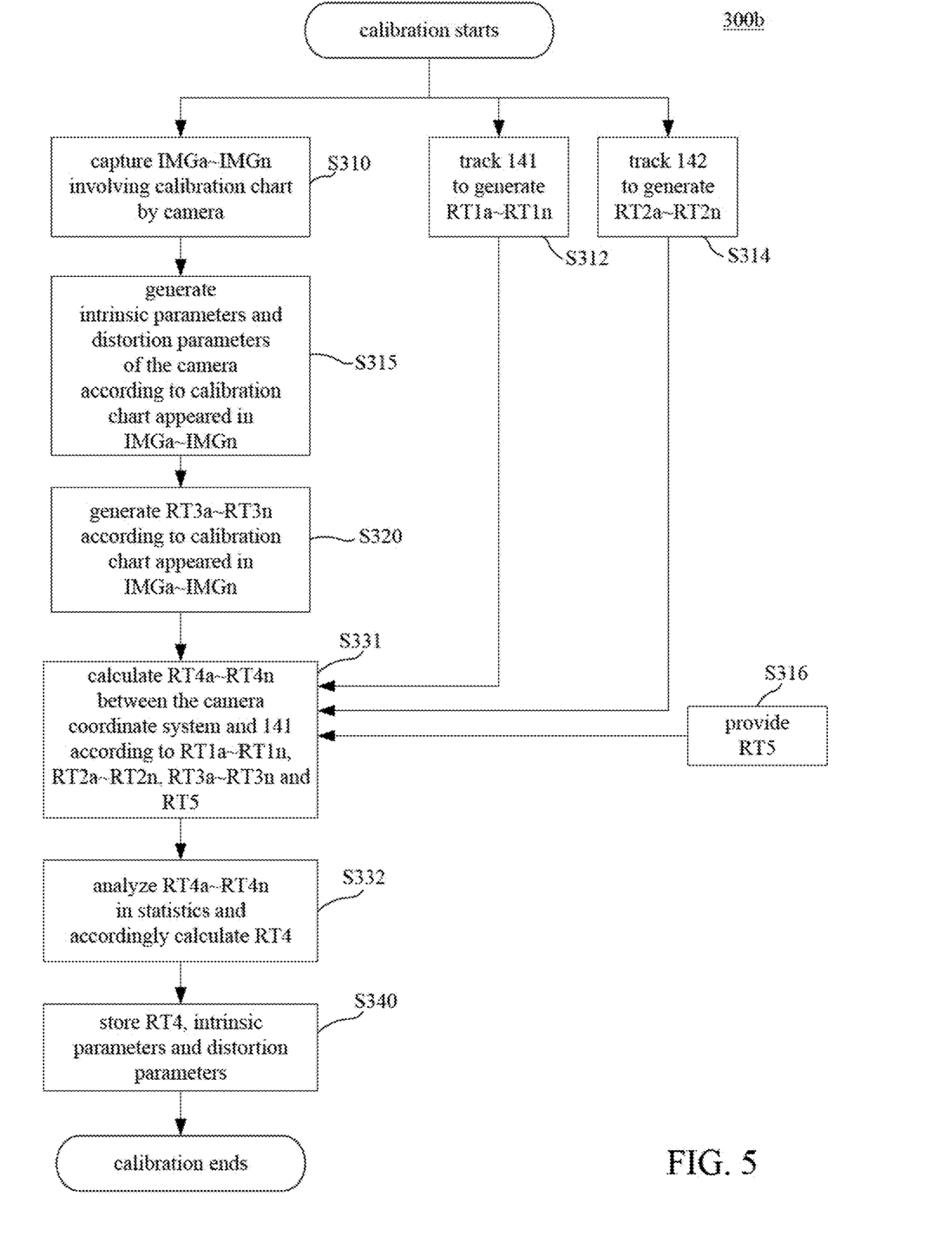
FIG. 5, which is another flow chart illustrating a control method performed by the tracking system in FIG. 2 during the calibration process.

In some embodiments, the camera 120 requires some calibration parameters (e.g., intrinsic parameters and/or distortion parameters) to adjust an image frame of the camera 120. In other words, based on the intrinsic parameters and/or the distortion parameters, the camera 120 can convert optical sensing results of pixel sensors into a frame of the image IMG accordingly. Reference is further made to FIG. 5, which is another flow chart illustrating a control method 300b performed by the tracking system 100 in FIG. 2 during the calibration process. In the embodiments shown in FIG. 5, the control method 300b is able to generate a fourth rotation-translation matrix RT4 (for tracking the camera 120) and also measure intrinsic parameters and/or distortion parameters of the camera 120.

The control method 300b in the embodiments shown in FIG. 5 is similar to the control method 300a in FIG. 3. One difference between the control methods 300a and 300b is that, as shown in FIG. 2 and FIG. 5, during step S310, the control method 300b triggers the camera to capture N images IMGa~IMGn involving the calibration chart 180. N is a positive integer larger than 1. For example, if N=5, the camera 120 can capture 5 different images involving the calibration chart 180. The control method 300b further includes step S315.

Figure 6A:
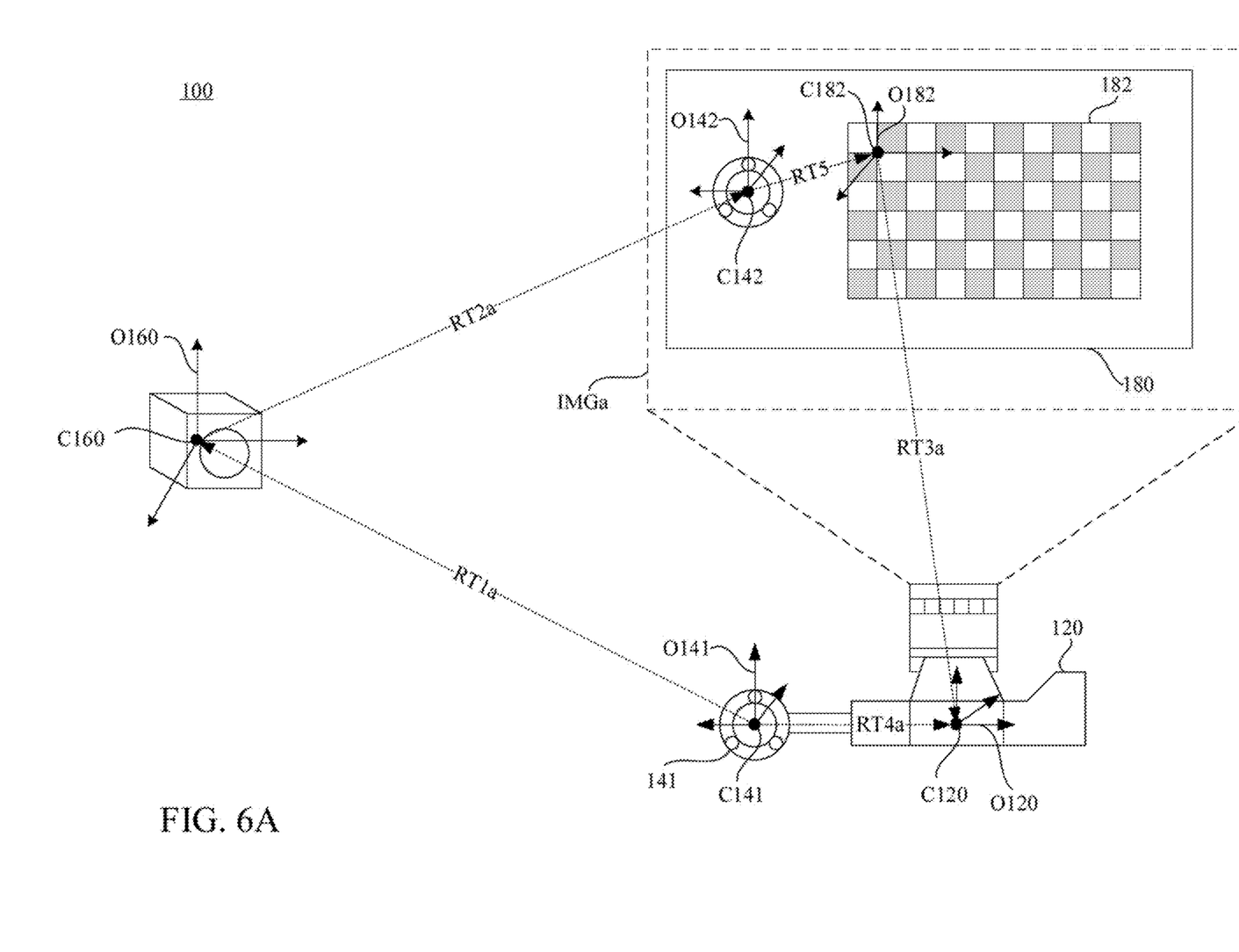
FIG. 6A and FIG. 6B are schematic diagrams illustrating the camera capturing the images at different positions relative to the calibration chart during the calibration process according to an embodiment of this disclosure.
Figure 6B:
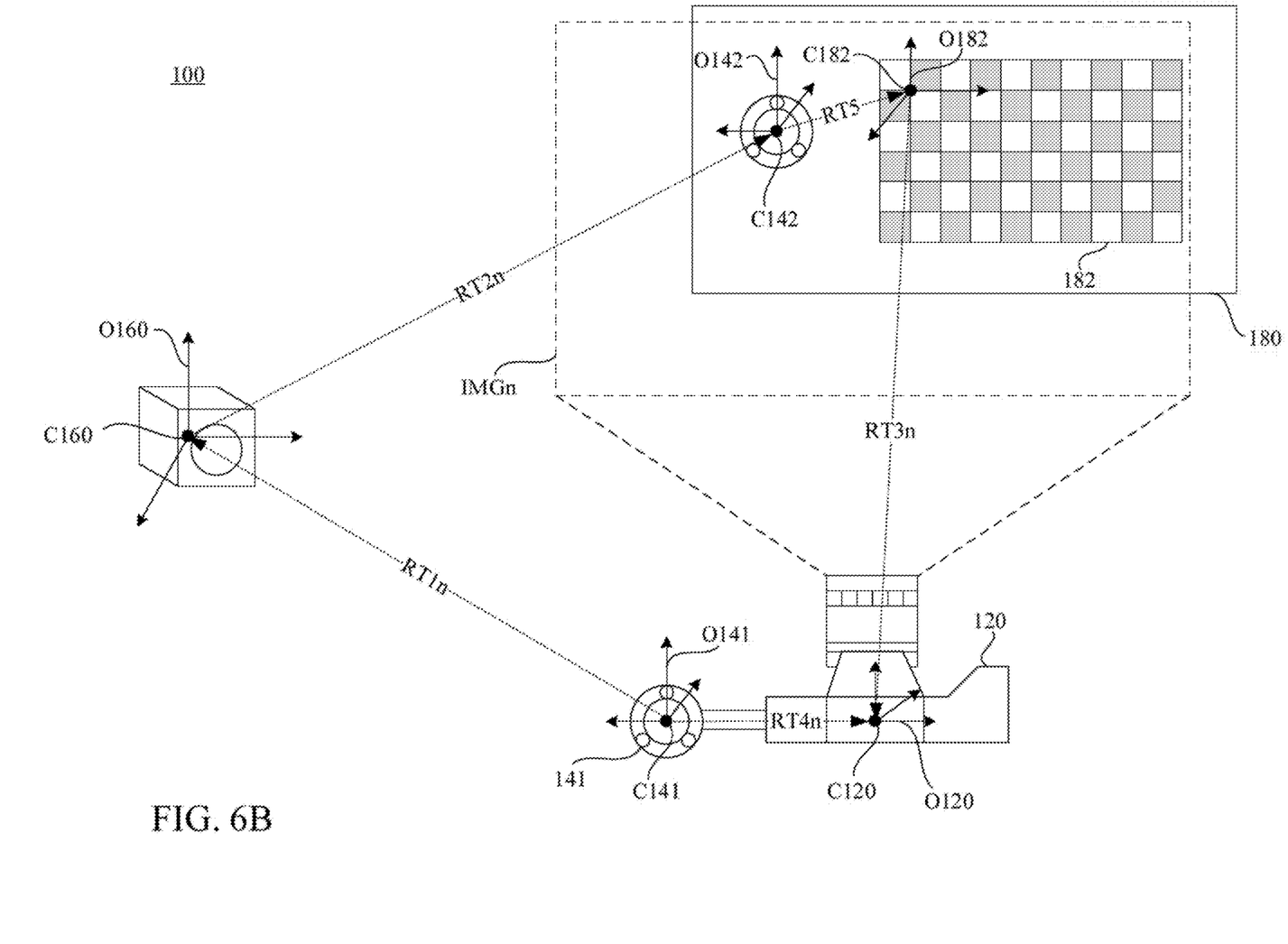

Reference is further made to FIG. 6A and FIG. 6B, which are schematic diagrams illustrating the camera 120 capturing the images IMGa~IMGn at different positions relative to the calibration chart 180 during the calibration process according to an embodiment of this disclosure.

As shown in FIG. 6A, the camera 120 is located at one position relative to the calibration chart 180, and the camera 120 capture one image IMGa; as shown in FIG. 6B, the camera 120 is located at another position relatve to the calibration chart 180, and the camera 120 capture another image IMGn. FIG. 6A and FIG. 6B illustrates two images IMGa and IMGn captured from two positions. However, the disclosure is not limited thereto. The camera 120 can moved to more different positions to capture more images.

In step S315, according to the feature pattern 182 of the calibration chart 180 appeared in the images IMGa~IMGn, the processing unit 190 can perform a geometric camera calibration to the camera 120, to generate intrinsic parameters and distortion parameters. In some embodiments, the geometric camera calibration is a process of estimating the intrinsic parameters and the distortion parameters of a camera model (e.g., a pinhole camera model) approximating the camera 120 that produced a given photograph (i.e., the feature pattern 182 shown in FIG. 2). It is noticed that the disclosure is not limited to the pinhole camera model, and other camera models can also be utilized to generate the intrinsic parameters and the distortion parameters. Details about how to perform the geometric camera calibration based on the camera model are widely discussed and well known by a skilled person in the art, and not to be mentioned here.

The intrinsic parameters are related to coordinate system transformations from the camera coordinate system O120 to a two-dimensional pixel coordinate system (for pixel sensors of the camera 120, not shown in figures) of the image IMG. The intrinsic parameters are affected by internal parameters inside the camera 120, for example, a focal length, the optical center C120 and a skew coefficient of the camera 120.

In this case, the intrinsic parameters generated in S315 can be stored, and be utilized to adjust an image frame of the camera 120 while the camera 120 is capturing an image without involving the calibration chart 180. For example, when the calibration process ends, the stored intrinsic parameters can be utilized to adjust the image frame of the camera 120 while the camera 120 is capturing an image or shooting a video or a film about the object OBJ (referring to FIG. 1).

The distortion parameters are related to nonlinear lens distortions of the camera 120. In some embodiments, the distortion parameters can also be calculated by the processing unit 190 in the geometric camera calibration.

In this case, the distortion parameters generated in S315 can be stored to adjust an image frame of the camera 120 while the camera 120 is capturing an image without involving the calibration chart 180. For example, when the calibration process ends, the stored distortion parameters can be utilized to adjust the image frame of the camera 120 while the camera 120 is capturing an image or shooting a video or a film about the object OBJ (referring to FIG. 1).

It is noticed that, ideally, the intrinsic parameters calculated in the S315 will be the same among the N images IMGa~IMGn; the distortion parameters calculated in the S315 will be the same among the N images IMGa~IMGn; it is because that the intrinsic parameters and the distortion parameters are affected by internal factors of the camera 120.

In step S320, the control method 300b utilizes a computer vision algorithm to generate N third rotation-translation matrices RT3a~RT3n, between the camera coordinate system O120 of the camera 120 and the calibration chart 180, according to the feature pattern 182 of the calibration chart 180 appeared in the images IMGa~IMGn. Each one of the N third rotation-translation matrices RT3a~RT3n is generated in a similar way discussed in aforesaid embodiments of step S320 (generating one third rotation-translation matrix RT3 according to one image IMG) shown in FIG. 3.

In step S331, the processing unit 190 calculates N candidate rotation-translation matrices RT4a~RT4n, between the camera coordinate system O120 and the first trackable device 141, according to the first rotation-translation matrices RT1a~RT1n, the second rotation-translation matrices RT2a~RT2n, the N third rotation-translation matrices RT3a~RT3n and the fifth rotation-translation matrix RT5.

Details about the steps S310-S331 of the control method 300b shown in FIG. 5 can be realized by performing N times of the step S310-S330 of the control method 300a while moving the camera 120 to different positions.

As shown in FIG. 5, step S332 is executed by the processing unit 190, to analyzing the N candidate rotation-translation matrices RT4a~RT4n in statistics, so as to calculate the fourth rotation-translation matrix RT4 according to analyzation of the N candidate rotation-translation matrices RT4a~RT4n.

In some embodiments, the fourth rotation-translation matrix RT4 can be generated according to an average of the N candidate rotation-translation matrices RT4a~RT4n.

In some other embodiments, the fourth rotation-translation matrix RT4 can be generated according to a median of the N candidate rotation-translation matrices RT4a~RT4n.

In some other embodiments, a standard deviation can be generated according to the N candidate rotation-translation matrices RT4a~RT4n. Afterward, the standard deviation can be utilized to determine whether each of the candidate rotation-translation matrices RT4a~RT4n is trustworthy or not. The control method 300b can delete untrustworthy candidates, and calculate the fourth rotation-translation matrix RT4 according to trustworthy candidates.

Step S340 is executed to store the fourth rotation-translation matrix RT4, the intrinsic parameters and the distortion parameters.

The control method 300b shown in FIG. 5 is able to the fourth rotation-translation matrix RT4 according to N different images IMGa~IMGn during the calibration process. It will be helpful to eliminate a potential error during the geometric camera calibration in S320.

Figure 7A:
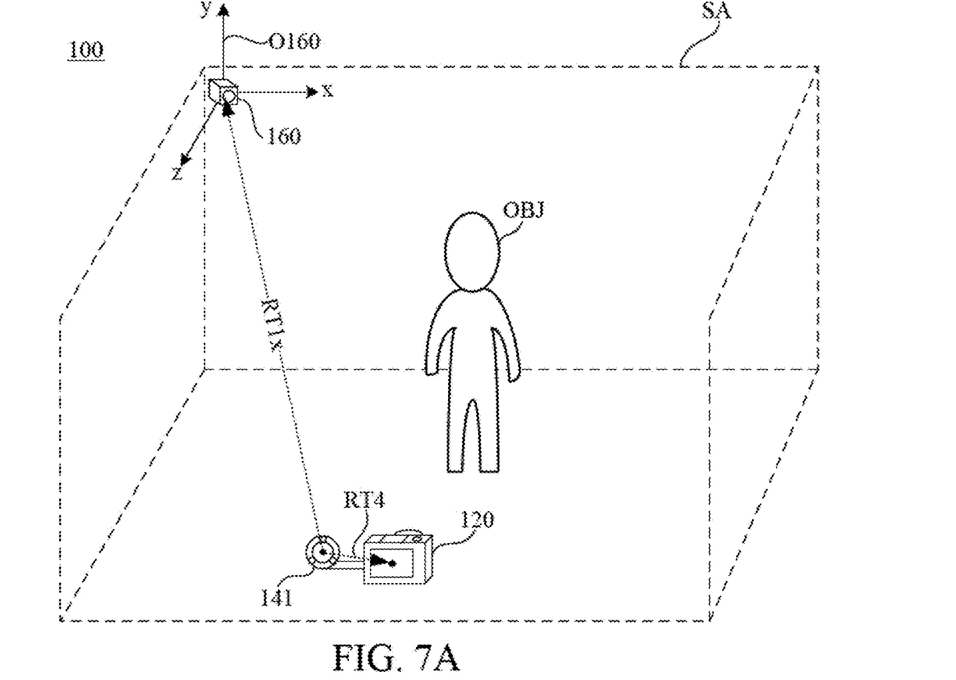
FIG. 7A and FIG. 7B are schematic diagrams illustrating the tracking system with a function to track the optical center of the camera in a normal application after the calibration process.
Figure 7B:
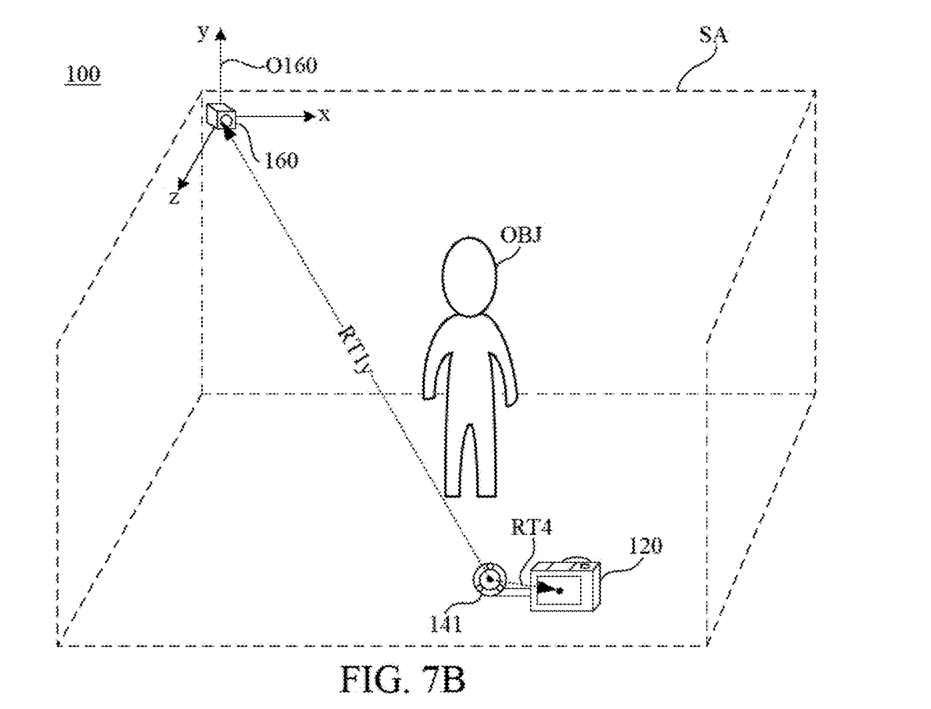

Reference is further made to FIG. 7A and FIG. 7B. FIG. 7A and FIG. 7B are schematic diagrams illustrating the tracking system 100 with a function to track the optical center C120 of the camera 120 in a normal application after the calibration process. As shown in FIG. 7A and FIG. 7B, in the normal application (e.g., shooting a video about the object OBJ by the camera 120), the camera 120 may move to different positions in the spatial area SA.

As shown in FIG. 7A, the camera 120 is moved to the left side in the spatial area SA. In the case, the tracking station 160 of the tracking system 100 is able to track the first trackable device 141 to generate a current first rotation-translation matrix RT1x. Based on the current first rotation-translation matrix RT1x and the stored fourth rotation-translation matrix RT4, the tracking system 100 is able to precisely track the camera 120.

As shown in FIG. 7B, the camera 120 is moved to the right side in the spatial area SA. In the case, the tracking station 160 of the tracking system 100 is able to track the first trackable device 141 to generate a current first rotation-translation matrix RT1y. Based on the current first rotation-translation matrix RT1y and the stored fourth rotation-translation matrix RT4, the tracking system 100 is able to precisely track the camera 120.

In this case, if the object OBJ captured by the camera 120 is merged with a virtual background (e.g., outer space) and some virtual objects (e.g., spaceships and aliens) in an immersive scenario, the view point of the camera 120 relative to the object OBJ can be precisely tracked, such that the object OBJ will appear to be real in the immersive scenario.

Figure 8:
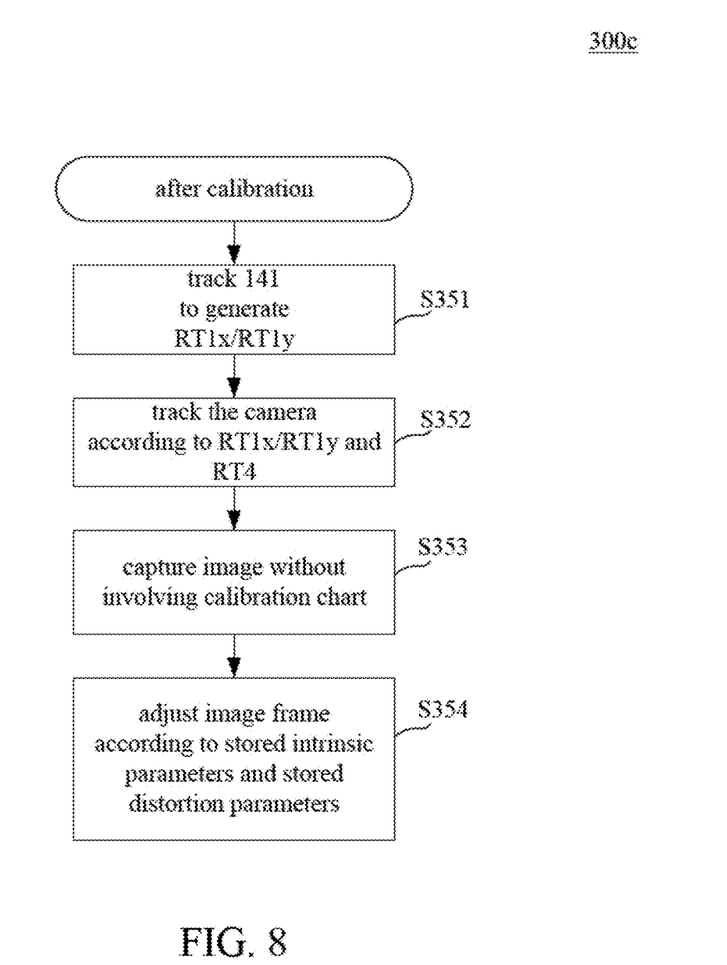
FIG. 8 is a flow chart illustrating a control method performed by the tracking system 100 in FIG. 7A and FIG. 7B after the calibration process.

Reference is further made to FIG. 8, which is a flow chart illustrating a control method 300c performed by the tracking system 100 in FIG. 7A and FIG. 7B after the calibration process.

As shown in FIG. 7A, FIG. 7B and FIG. 8, step S351 is executed to track the first trackable device 141 by the tracking station 160 to generate the current first rotation-translation matrix RT1x/RT1y. Step S352 is executed to track the camera 120 according to the current first rotation-translation matrix RT1x/RT1y and the fourth rotation-translation matrix RT4 stored in previous calibration process. Step S353 is executed by the camera 120 to capture images without involving the calibration chart (referring to the calibration chart 180 shown in FIG. 2). For example, the camera 120 is able to capture images, streaming images and/or videos about different objects (e.g., actors, buildings, animals or landscapes). Step S354 is executed to adjust an image frame of the camera 120 according to the stored intrinsic parameters and the stored distortion parameters.

Another embodiment of the disclosure includes a non-transitory computer-readable storage medium, which stores at least one instruction program executed by a processing unit (referring to the processing unit 190 shown in FIG. 2 discussed in aforesaid embodiments) to perform control methods 300a, 300b and 300c as shown in FIG. 3, FIG. 5 and FIG. 8.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A control method, comprising:
    capturing at least one image involving a calibration chart by a camera, wherein a first trackable device is physically attached to the camera, a second trackable device is physically attached to the calibration chart;
    tracking the first trackable device and the second trackable device by a tracking station, to generate a first rotation-translation matrix, between the first trackable device and the tracking station, and a second rotation-translation matrix, between the second trackable device and the tracking station;
    generating a third rotation-translation matrix, between a camera coordinate system of the camera and the calibration chart according to the calibration chart appeared in the at least one image; and
    calculating a fourth rotation-translation matrix, between the camera coordinate system and the first trackable device, according to the first rotation-translation matrix, the second rotation-translation matrix and the third rotation-translation matrix, wherein the fourth rotation-translation matrix is utilized to track the camera.

2. The control method of claim 1, wherein the calibration chart comprises a feature pattern and a mounting socket, the second trackable device is attached on the mounting socket and located with a mechanical arrangement relative to the feature pattern, a fifth rotation-translation matrix between the calibration chart and the second trackable device is derived from the mechanical arrangement, the fourth rotation-translation matrix is calculated further according to the fifth rotation-translation matrix.

3. The control method of claim 2, wherein the fourth rotation-translation matrix is calculated according to a product of the third rotation-translation matrix, the fifth rotation-translation matrix, the second rotation-translation matrix and the first rotation-translation matrix.

4. The control method of claim 1, wherein the camera coordinate system is originated at an optical center of the camera, the fourth rotation-translation matrix is configured to describe a rotational relationship and a positional relationship between the camera coordinate system and the first trackable device.

5. The control method of claim 1, further comprising:
capturing N images involving the calibration chart by the camera, wherein N is a positive integer larger than 1; and
according to the calibration chart appeared in the N images, performing a geometric camera calibration to generate intrinsic parameters and distortion parameters.

6. The control method of claim 5, wherein the intrinsic parameters are related to coordinate system transformations from the camera coordinate system to a two-dimensional pixel coordinate system of one of the N images, the intrinsic parameters are affected by a focal length, an optical center and a skew coefficient of the camera, the intrinsic parameters are stored to adjust an image frame of the camera while the camera is capturing another image without involving the calibration chart.

7. The control method of claim 5, wherein the distortion parameters are related to nonlinear lens distortions of the camera, the distortion parameters are stored to adjust an image frame of the camera while the camera is capturing another image without involving the calibration chart.

8. The control method of claim 1, further comprising:
capturing N images involving the calibration chart by the camera, wherein N is a positive integer larger than 1;
generating N third rotation-translation matrices, between the camera coordinate system of the camera and the calibration chart according to the calibration chart appeared in the N images;
calculating N candidate rotation-translation matrices, between the camera coordinate system and the first trackable device, according to the first rotation-translation matrix, the second rotation-translation matrix and the N third rotation-translation matrices;
analyzing the N candidate rotation-translation matrices in statistics; and
calculating the fourth rotation-translation matrix according to analyzation of the N candidate rotation-translation matrices.

9. A tracking system, comprising:
a camera, configured to capture at least one image involving a calibration chart;
a first trackable device, physically attached to the camera;
a second trackable device, physically attached to the calibration chart;
a tracking station, configured to track the first trackable device and the second trackable device, for generating a first rotation-translation matrix, between the first trackable device and the tracking station, and a second rotation-translation matrix, between the second trackable device and the tracking station;
a processing unit, communicated with the tracking station and the camera, wherein the processing unit is configured to:
generate a third rotation-translation matrix, between a camera coordinate system of the camera and the calibration chart according to the calibration chart appeared in the at least one image;
calculate a fourth rotation-translation matrix, between the camera coordinate system and the first trackable device, according to the first rotation-translation matrix, the second rotation-translation matrix and the third rotation-translation matrix; and
track the camera according to the first trackable device and the fourth rotation-translation matrix.

10. The tracking system of claim 9, wherein the calibration chart comprises a feature pattern and a mounting socket, the second trackable device is attached on the mounting socket and located with a mechanical arrangement relative to the feature pattern, a fifth rotation-translation matrix between the calibration chart and the second trackable device is derived from the mechanical arrangement, the fourth rotation-translation matrix is calculated further according to the fifth rotation-translation matrix.

11. The tracking system of claim 10, wherein the fourth rotation-translation matrix is calculated according to a product of the third rotation-translation matrix, the fifth rotation-translation matrix, the second rotation-translation matrix and the first rotation-translation matrix.

12. The tracking system of claim 9, wherein the camera coordinate system is originated at an optical center of the camera, the fourth rotation-translation matrix is configured to describe a rotational relationship and a positional relationship between the camera coordinate system and the first trackable device.

13. The tracking system of claim 9, wherein the processing unit performs a geometric camera calibration about the camera according to the calibration chart appeared in the at least one image, so as to generate intrinsic parameters and distortion parameters.

14. The tracking system of claim 13, wherein the intrinsic parameters are related to coordinate system transformations from the camera coordinate system to a two-dimensional pixel coordinate system of the at least one image, the intrinsic parameters are affected by a focal length, an optical center and a skew coefficient of the camera, the intrinsic parameters are stored to adjust an image frame of the camera while the camera is capturing another image without involving the calibration chart.

15. The tracking system of claim 13, wherein the distortion parameters are related to nonlinear lens distortions of the camera, the distortion parameters are stored to adjust an image frame of the camera while the camera is capturing another image without involving the calibration chart.

16. The tracking system of claim 9, wherein the camera captures N images involving the calibration chart, wherein N is a positive integer larger than 1,
the processing unit generates N third rotation-translation matrices, between the camera coordinate system of the camera and the calibration chart according to the calibration chart appeared in the N images,
the processing unit calculates N candidate rotation-translation matrices, between the camera coordinate system and the first trackable device, according to the first rotation-translation matrix, the second rotation-translation matrix and the N third rotation-translation matrices, the processing unit analyzes the N candidate rotation-translation matrices in statistics, and the processing unit calculates the fourth rotation-translation matrix according to analyzation of the N candidate rotation-translation matrices.

17. A non-transitory computer-readable storage medium, storing at least one instruction program executed by a processing unit to perform a tracking method, the tracking method comprising:

capturing at least one image involving a calibration chart by a camera, wherein a first trackable device is physically attached to the camera, a second trackable device is physically attached to the calibration chart;

tracking the first trackable device and the second trackable device by a tracking station, to generate a first rotation-translation matrix, between the first trackable device and the tracking station, and a second rotation-translation matrix, between the second trackable device and the tracking station;

generating a third rotation-translation matrix, between a camera coordinate system of the camera and the calibration chart according to the calibration chart appeared in the at least one image; and calculating a fourth rotation-translation matrix, between the camera coordinate system and the first trackable device, according to the first rotation-translation matrix, the second rotation-translation matrix and the third rotation-translation matrix, wherein the fourth rotation-translation matrix is utilized to track the camera.

18. The non-transitory computer-readable storage medium of claim 17, wherein the tracking method comprises:

capturing N images involving the calibration chart by the camera, wherein N is a positive integer larger than 1; and according to the calibration chart appeared in the N images, performing a geometric camera calibration to generate intrinsic parameters and distortion parameters.

19. The non-transitory computer-readable storage medium of claim 18, wherein the intrinsic parameters are related to coordinate system transformations from the camera coordinate system to a two-dimensional pixel coordinate system of one of the N images, the intrinsic parameters are affected by a focal length, an optical center and a skew coefficient of the camera, the intrinsic parameters are stored to adjust an image frame of the camera while the camera is capturing another image without involving the calibration chart, the distortion parameters are related to nonlinear lens distortions of the camera, the distortion parameters are stored to adjust an image frame of the camera while the camera is capturing another image without involving the calibration chart.

20. The non-transitory computer-readable storage medium of claim 17, wherein the tracking method comprises:

capturing N images involving the calibration chart by the camera, wherein N is a positive integer larger than 1;

generating N third rotation-translation matrices, between the camera coordinate system of the camera and the calibration chart according to the calibration chart appeared in the N images;

calculating N candidate rotation-translation matrices, between the camera coordinate system and the first trackable device, according to the first rotation-translation matrix, the second rotation-translation matrix and the N third rotation-translation matrices;

analyzing the N candidate rotation-translation matrices in statistics; and calculating the fourth rotation-translation matrix according to analyzation of the N candidate rotation-translation matrices.

* * * * *